United States Patent [19]

Chihara et al.

[11] Patent Number: 5,221,707
[45] Date of Patent: * Jun. 22, 1993

[54] COATING BLEND COMPOSITIONS

[75] Inventors: Kohji Y. Chihara, Hudson, Ohio; James R. Goewey, Marion, Ind.

[73] Assignee: GenCorp Inc., Fairlawn, Ohio

[*] Notice: The portion of the term of this patent subsequent to May 19, 2009 has been disclaimed.

[21] Appl. No.: 711,486

[22] Filed: Jun. 6, 1991

Related U.S. Application Data

[63] Continuation-in-part of Ser. No. 658,730, Feb. 21, 1991, Pat. No. 5,115,007, which is a continuation-in-part of Ser. No. 443,413, Nov. 30, 1989, abandoned.

[51] Int. Cl.$^5$ .............................................. C08K 5/54
[52] U.S. Cl. .................................................. 524/267
[58] Field of Search ........................................ 524/267

[56] References Cited

U.S. PATENT DOCUMENTS

| | | | |
|---|---|---|---|
| 4,101,530 | 7/1978 | Burkhardt et al. | 528/45 |
| 4,267,206 | 5/1981 | Johnson | 427/128 |
| 4,606,974 | 8/1986 | Thoma et al. | 428/447 |
| 4,631,206 | 12/1986 | Mabuchi et al. | 427/340 |
| 4,856,502 | 8/1989 | Ersfeld et al. | 128/90 |
| 4,898,919 | 2/1990 | Ueda et al. | 525/440 |

FOREIGN PATENT DOCUMENTS

| | | |
|---|---|---|
| 59-201838 | 1/1984 | Japan . |
| 60-173011 | 4/1985 | Japan . |
| 60-179470 | 4/1985 | Japan . |
| 60-181137 | 5/1985 | Japan . |
| 60-179251 | 6/1985 | Japan . |
| 60-24821 | 12/1985 | Japan . |
| 61-137735 | 7/1986 | Japan . |
| 61-136528 | 12/1986 | Japan . |
| 62-41215 | 9/1987 | Japan . |
| 63-130616 | 2/1988 | Japan . |
| 64-6017 | 7/1989 | Japan . |

*Primary Examiner*—Paul R. Michl
*Assistant Examiner*—Edward J. Cain

[57] ABSTRACT

A coating blend composition is a physical admixture of an adhesion promoter resin and a coating material resin. The blend can be cured by one or more curing agents existing within either the adhesion promoter resin, the coating material resin, or both. The utilization of such a blend eliminates the need for priming a substrate such as a rubber, or a thermoplastic or a thermoset polyolefin. The adhesion promoter resin is a urethane composition containing a blocked polyurethane prepolymer whereas the coating material resin can generally be any compound which has a functional or cosmetic purpose such as a different type of blocked polyurethane, and is generally utilized in a major amount. A particular application of the coating blend compositions of the present invention is to a glass run channel made from, for example, EPDM, as in an automotive door.

37 Claims, No Drawings

COATING BLEND COMPOSITIONS

CROSS-REFERENCE

This application is a continuation-in-part of U.S. Ser. No. 07/658,730, filed Feb. 21, 1991, now U.S. Pat. No. 5,115,007 by Kohji Y. Chihara et al, for "Abrasion-Resistant Polyurethane Blend Compositions," which in turn is a continuation-in-part of U.S. Ser. No 07/443,413, filed Nov. 30, 1989, now abandoned by Kohji Y. Chihara et al, for "Abrasion-Resistant Polyurethane Blend Compositions."

FIELD OF THE INVENTION

The present invention relates to a primerless, one-part, storage-stable, fast heat-curable, coating blend composition which is useful as a cosmetic coating, a functional coating, or the like, wherein the functional coating can be for elastomeric substrates such as an automotive window glass run channel made from ethylene-propylene-diene polymers (EPDM). More specifically, the present invention comprises generally a minor amount of an adhesion promoter resin which is a blocked polyurethane prepolymer derived from hydroxy terminated hydrogenated diene polymers or polyolefins, and a coating material resin such as a blocked polyurethane prepolymer derived from one or more hydroxy terminated polyethers and/or polyesters. The blend is readily cured as through moisture and/or the use of one or more curing agents.

BACKGROUND OF THE INVENTION

U.S. Pat. No. 4,898,919, issued Feb. 6, 1990, to Ueda et al., relates to a polyurethane adhesive comprising (a) a specific block polyurethane polyol produced by reacting a hydrogenated polybutadiene glycol, a polyol having two or more hydroxy groups, and a polyisocyanate, (b) a thermoplastic polyester urethane rubber, and (c) a polyisocyanate compound as a crosslinking agent, said polyurethane adhesive being useful for adhesion of low polar materials, particularly adhesion between polypropylene materials and sheets of polyvinyl chloride.

Japanese Patent applications JP 60-173011 (1985), JP 62-41215 (1987), JP 63-130616, and JP 64-6017 (1989), relate to polyurethane compositions made from low molecular weight polyolefin polyols and are directed to adhesives, coatings, and sealants. In Japanese patent JP 60-179251 (1985), a mixture of a low molecular weight polyolefin polyol and a blocked methylene diphenyl diisocyanate is utilized as an adhesive for splicing an EPDM glass run channel and weather stripping, while JP 60-181137 (1985) suggests that the same composition can be used as an adhesive to obtain adhesion between EPR (ethylene-propylene rubber) and metal as well as between plastics and rubber. Jp 61-136528 (1986) relates to a low molecular weight polyolefin polyol mixed with an N-halogenated amide functional compound used as a coating primer for an EPDM glass run channel where the top coat is a polyester-urethane based coating containing silicone oil while JP 61-137735 (1986) discloses the same composition as an adhesive for fiber flocking on an EPDM glass run channel. Japanese patent application JP 60-179470 and patent JP 60-24821 relate to the utilization of greater than 98 percent hydrogenated polyhydroxy polybutadiene as (a) a crosslinking agent, or (b) an additional polyol component in a polyester and/or polyether urethane coating compositions which are applied to flocked substrates to enhance their resistance to abrasion, weathering, and heat. Japanese Application JP 59-201838 relates to a coextruded rubber product having a sliding surface as well as to a fabrication method therefor, wherein a rubber substrate is coextruded with a sliding surface composition which is a mixture of urethane forming components. Subsequently, the substrate as well as the sliding surface are vulcanized and cured at the same time.

SUMMARY OF THE INVENTION

The coating blend compositions of the present invention are an admixture of an adhesion promoter resin and a coating material resin such as a low-friction, abrasion-resistant polyurethane composition. The amount of the adhesion promoter resin is generally low, as from about ½ to about 50 percent by weight based upon the total weight of the adhesion promoter resin and the coating material resin. The adhesion promoter resin is generally a polymeric binder system comprising a blocked polyurethane prepolymer produced by reacting a low molecular weight hydroxyl terminated hydrogenated diene polymer or polyolefin, preferably a hydrogenated polydiene, often with excess equivalents of polyisocyanate, and then blocking the free isocyanate groups. The coating material resin can be any coating material having desirable properties, either functional or cosmetic, which is to be applied generally to a rubber substrate and desirably is a blocked polyurethane prepolymer, e.g., a polyether polyurethane or a polyester polyurethane. The coating blend can be cured on the substrate through the use of moisture and/or one or more curing agents.

DETAILED DESCRIPTION OF THE INVENTION

The present invention relates to an abrasion-resistant polyurethane composition which can be utilized by itself, or alternatively, is utilized as an adhesion promoter resin blended with a coating material resin to form a coating blend resin composition which can be subsequently cured. The abrasion-resistant polyurethane composition generally contains a blocked urethane containing a crosslinking agent and silicone oil. When used as an adhesion promoter resin, the amount thereof is generally small or low in comparison with the amount of the coating material resin. For example, when the coating blend composition is applied to a cured substrate, the amount of the adhesion promoter resin based upon the total amount of the adhesion promoter resin and the coating resin is generally from about 0.5 percent to about 25 percent by weight, desirably from about 1.0 percent to about 10 percent by weight, and preferably from about 3 percent to about 6 percent by weight. When utilized on an uncured substrate, the amount of promoter resin in the blend is generally from about 2.0 or 3.0 percent to about 50 percent by weight, desirably from about 5 to about 40, and preferably from about 15 to about 30 percent by weight. Generally, the coating composition blend can be cured according to a plurality of different methods and/or compounds.

ABRASION-RESISTANT POLYURETHANE COMPOSITION

The blocked polyurethane is produced by reacting a hydroxyl terminated hydrogenated diene polymer or polyolefin with excess equivalents of diisocyanate, where the resulting free isocyanate end groups are blocked with a suitable blocking agent which will unblock upon heating. Typical diene monomers used to produce the diene polymers are conjugated dienes, having from 4 to 10 carbon atoms, or combinations thereof, such as 1,3-butadiene, isoprene or dimethyl butadienes and the like. The polymerization of the diene monomer, typically, may be done via anionic initiation (e.g. with di-lithium hydrocarbyl initiators) or via free-radical polymerization, e.g. by initiation with hydrogen peroxide, which also introduces hydroxy end groups. In anionic polymerization, OH-end groups are advantageously introduced by reaction of the polymeric carbon-ion chain ends with ethylene oxide. These techniques are generally well known. The hydroxy-functional polydienes may be hydrogenated, for example, partially or substantially (i.e., at least 90 percent of the unsaturated sites), and even completely hydrogenated, according to any conventional method known to the art. Complete hydrogenation of various diene polymers such as 1,4-polyisoprene is equivalent to an alternating ethylene/propylene hydrocarbon polymer. The polyolefins are made from monomers having from 2 to 6 carbon atoms such as ethene, propene, and the like. The intermediate hydrocarbon polymers of the present invention have a number average molecular weight from about 500 to 15,000 and preferably from about 1,000 to about 8,000. Intermediates are desirably liquid at room temperature, but can have a melting point up to about 80° C. Preferred intermediates are hydroxyl functional telechelic, completely hydrogenated diene polymers containing 2 to 6 and preferably 2 to 4 hydroxy end groups per polymeric molecule (polymer unit). Preferred hydroxyl functional polyolefins are derived from hydrogenated polybutadiene, poly(butadiene-styrene), polyisoprene, and the like. Particularly preferred intermediates are hydroxy terminated polydienes, which are completely hydrogenated (i.e., have less than 1 or 2 percent unsaturation sites), and contain the desired hydroxyl functionality. Polymers with more than two hydroxyl groups on the average per polymer molecule may be considered as branched or star-type polymers.

The hydroxyl functional polyolefins can also be made by utilizing minor amounts (i.e. up to about 50 mole percent and preferably up to 20 mole percent) of ethylenically unsaturated comonomers such as styrene, vinyl toluene, alpha-methylstyrene, divinylbenzene, and similar aromatic monomers; or vinyl monomers, such as acrylonitrile, methacrylonitrile, vinylidene chloride, and similar aliphatic vinyl monomers; or hydroxyl functional ethylenically unsaturated monomers such as 2-hydroxyl ethyl acrylate and methacrylate, 2-hydroxy propyl acrylate and methacrylate and similar hydroxy alkyl acrylates. Regardless of the type of intermediate polyolefin, it should contain at least 1.5 hydroxyl groups from about 1.8 to about 6 hydroxyl groups per average molecule, desirably from about 1.8 to about 2.3, and preferably from about 1.9 to about 2.1 hydroxyl groups.

An especially preferred intermediate polyolefin is a hydrogenated butadiene polymer. Such an intermediate is commercially available as Polytail H and Polytail HA from Mitsubishi Kasei Corp. It has the very generalized structure:

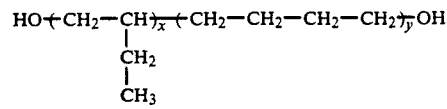

wherein X and Y are randomly distributed and the structure can contain additional —OH groups, and the X/Y ratio, the —OH number per polymeric molecule, the physical state at 25° C., and the melting points are as follows:

|  | Polytail H | Polytail HA | Preferred Range |
| --- | --- | --- | --- |
| X/Y | 2/8 | 9/1 | 0.10 to 10.0 |
| OH Number* | 2.3 | 1.8 | 1.5–4 |
| Physical State | Waxy solid | Liquid | Liquid to low melting solid (MP ≦ 80° C.) |

*Number OH groups/average molecule

In accordance with the present invention, the hydroxyl functional polyolefin intermediates, described above are reacted with excess equivalents of a polyisocyanate $R(NCO)_n$, where n is 2 to 4 and preferably 2.0 (i.e. diisocyanate), or mixtures of various di, triisocyanates, etc. such that n is from about 1.7 to about 2.3, and preferably from about 1.9 to about 2.1, and where R is aliphatic, aromatic, or combinations thereof (e.g., aliphatic substituted aromatics), having from 4 to 100 carbon atoms and preferably from 4 to 20 or 30 carbon atoms to produce an isocyanate terminated functionally reactive urethane prepolymer. At least about 1.8 equivalents and preferably from about 2 to about 8 equivalents of the polyisocyanate reactant are charged per equivalent of hydroxyl functional hydrocarbon polymer to produce the desired urethane prepolymer. Preferred aromatic diisocyanates include 4,4-methylene diphenyl isocyanate (MDI), as well as modified MDI known as Isonates (Dow Chemical), toluene diisocyanate (TDI) such as the 2,4-or 2,6-isomers, as well as mixtures thereof, 1,4-phenylene diisocyanate, m- and p-xylenene diisocyanates (XDI), and the like. Preferred aliphatic diisocyanates include 1,6-hexane diisocyanate, mixed trimethylhexane diisocyanate (TMI), isophorone diisocyanate (IPDI), and the like. An example of a triisocyanate is Desmodur ® N-3300, an aliphatic polyisocyanate base upon hexamethylene diisocyanate. Whenever a triisocyanate is utilized, the amount thereof is very small, for example, up to 10 moles, based upon the number of moles of the blocked prepolymer. Mixtures of various polydiisocyanates can be used if desired.

Suitable blocking agents for blocking the isocyanate terminated urethane prepolymer are known to the art and to the literature and include various lactams having from 3 to about 12 carbon atoms, such as epsiloncaprolactam, propiolactam, dimethyl propiolactam, 2-pyrrolidone, gamma-valerolactam, epsilon-laurolactam, and the like. Another group of blocking agents include the various ketoximes having from about 3 to about 20 and desirably from 3 to about 15 carbon atoms such as: dimethyl-, methylethyl-, diisopropyl-, dicyclohexylketoximine, benzophenone and the like. Various phenols, such as 4-hydroxy-(methyl) benzoate, methyl salicylate, ethyl salicylate, phenol, o-, m-, and p-cresol, nonylphenols, $C_{15}H_{27}$ phenols, and the like, containing from 3 to 20 carbon atoms can also be utilized. Various cyclic ureas having a total of from 3 to 12 carbon atoms such as trimethylene or tetramethylene urea can also be utilized. Various enamines having the formula

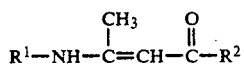

where $R^1$ and $R^2$, independently, is an alkyl having from 1 to 4 carbon atoms can also be utilized. Another group of blocking agents are the various dicarbonyl compounds having the general formula

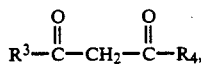

where $R^3$ and $R^4$, independently, is an alkyl having from 1 to 6 carbon atoms, phenyl, or $R^5O$, where $R^5$ is hydrogen or an alkyl having from 1 to 12 carbon atoms such as: acetylacetone, diethylmalonate, dimethylmalonate, acetylethyl acetate, and the like. Still other blocking agents include benzotriazole, the various phenylimidazoles, and the like. The amount of blocking agent utilized should generally be an approximate equivalent ratio of NCO/blocking agent of from about 0.5 to 2.0 and preferably from about 0.9 to about 1.1. Preferred blocking agents include caprolactam and the various ketoximes.

An important aspect of the present invention is the use of crosslinking agents to obtain improved physical properties such as abrasion resistance. The various crosslinking or curing agents which can be utilized include those containing $-NH_2$, $-NHR^6$, etc. groups, where $R^6$ is an alkyl having from 1 to 4 carbon atoms, $-OH$, or $-SH$ groups, and the like, which react with the blocked or unblocked isocyanate groups of the urethane prepolymer upon heating. Such crosslinking or curing agents are known to the art and to the literature. Particularly preferred curatives or crosslinking agents comprise aliphatic, primary or secondary di-, tri-, and tetra-functional amines having a boiling point above about 100° C. and preferably above 180° C. Useful amine crosslinking agents include, for example, polyoxypropylene- or polyoxy(propylene/ethylene)-based primary di- and triamines sold by Texaco Chemical Company under the tradename "Jeffamine," which are herein fully incorporated by reference, such as T-403 (triamine; MW about 480), EDR-148 (diamine; MW about 150), T-3000 (triamine; MW about 3,000), T-5000 (triamine; MW about 5,000), D-230 (diamine; MW about 200), D-400 (diamine; MW about 400), or D-2000 (diamine; MW about 2,000). Other crosslinking agents include polyamine resins containing amino end groups, sold by Henkel Corporation under the tradenames "Versamid" or "Genamid," which are hereby fully incorporated by reference, such as Versamids 100, 115, 125, 140, 150, 250, or Genamids 250, 747, 2000, and the like. Still other useful amine curatives include isophoronediamine (Huels Co.), mixed trimethylenediamine (TMD; Huels Co , N,N'-diaminoethylpiperazine, N-aminoethylpiperazine,1,4-cyclohexanediamine, 1,6-hexanediamine, 1,4-butanediamine, diethylenetriamine, m- or p-xylylenediamine, ethylenediamine, liquid poly(-dimethylsiloxane)-diamine; various aromatic di- or triamine-s, which are liquid, or low melting, soluble or dispersible in the coating mixture, such as a ring methylated phenylenediamine (RDX-66884, sold by Interez Co.) or poly(tetramethylene oxide)-bis-(4-aminobenzoates) (Polyamine-650 and —1000 sold by Air Products), and the like.

Other useful crosslinking agents include polyols (diols, triols or tetrols) having a number average molecular weight of from about 200 to about 1,000, which may be used either alone or in combination with diamines, and generally have a total of from 2 to about 100 carbon atoms. Desired polyols have primary hydroxyl groups, as well as tertiary, secondary or primary amino groups in their structures, such as triethanolamine, diethanolamine or ethanolamine. Curatives with two or more sulfuryl groups or combinations of $NH_2$, OH and SH can also be utilized.

The ratio of blocked isocyanate groups to curative groups ($-NH_2$, $-NHR^6$, $-OH$, or $-SH$) is generally from about 0.8 to infinity, that is, where no curing agent is utilized, desirably from about 1 or 2 to about 20, 30, or 50, more desirably from about 2 to about 10 or from about 2 to about 4, preferably from about 0.8 to about 3.8, and on some occasions, from about 0.8 to about 2.0, and preferably from about 1.0 to about 2.0. Shelf life of coatings containing a crosslinking agent, such as polyamine, is at least about two weeks at ambient temperatures.

Although curing of blocked polyurethanes with a polyamine curing agent normally does not require an added catalyst, urethane curing catalysts can be utilized, especially if polyols are used as curatives. Such catalysts are well known to the art and to the literature and include, for example, stannous octoate, various tin catalysts such as dioctyltin dilaurate, dibutytin dilaurate, etc., and various tertiary amines. Advantageously, these catalysts are added during the preparation of the isocyanate terminated hydrocarbon polyols to assist in the formation of the isocyanate terminated prepolymer and/or to facilitate the blocking of the isocyanate groups. The amount of the catalyst is generally from about 0.1 percent to about 5 percent catalyst by weight based upon the total amount, by weight, of reactants which form the blocked polyurethane.

Cure, that is, crosslinking of the prepolymers as well as other reactions, is generally carried out at from about 20° C. to about 255° C., desirably from about 160° C. to about 250° C., and preferably from about 170° C. to about 230° C.

In accordance with the present invention, variable amounts of silicone oil are added to the composition or mixture of blocked polyurethane prepolymer and crosslinking agent. Silicone oils are low molecular weight liquids or fluid silicone polymers and generally have a silicone backbone structure comprising alternate silicon and oxygen atoms with the generalized structure

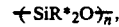

where R*, independently is an alkyl group having from 1 to 4 carbon atoms and preferably is methyl, and "n" is from 2 to about 5,000. The silicon polymer can also contain minor amounts, that is up to about 40 percent, or up to 10 percent of repeating units such as fluoroalkyl (1 to 4 carbon atoms), or phenyl, as well as substituted hydrogen, chlorine or alkoxy (1 to 4 carbon atoms) groups. Suitable silicone oils in accordance with the present invention have a viscosity from about 0.5 centistokes to about 2,500,000 centistokes and preferably from about 500 to about 1,000,000 centistokes. Preferred silicone oils are linear polydimethylsiloxanes, with trimethylsiloxy terminated polysiloxanes and derivatives thereof being most preferred. Silicone oils are added to the blocked polyurethane and crosslinked mixture at levels from about 1 part to about 100 parts per 100 parts by weight blocked polyurethane, and preferably from about 5 parts to about 80 parts per 100 parts of blocked polyurethane.

The blocked polyurethane prepolymer can be prepared by first mixing a hydroxy terminated polyolefin, such as hydrogenated hydroxy terminated polybutadiene with dry toluene. A catalyst, such as dibutyltin dilaurate, may be added, if desired. The dried hydroxypolyolefin solution is added slowly to a solution of diisocyanate in anhydrous toluene over a time period of about 0.5 to 2 hours, under nitrogen, while vigorously agitating the resulting mixture at temperatures of about 100° C. to about 120° C. Agitation can continue until the isocyanate content reaches approximately the calculated theoretical level. Thereafter, a blocking agent is added to the mixture and allowed to react with the terminal NCO groups. The blocking reaction may be monitored by transmission IR or by titration of the NCO with dibutylamine.

The resulting blocked polyurethane prepolymer solutions are then compounded with silicone oil and a crosslinking agent to form the thermosetting polymeric binder, in accordance with the present invention. Compounding additives, such as micropowders of fumed silica, nylon, polyethylene, Teflon, polystyrene, molybdenum disulfide, glass beads, and the like, which serve as fillers to control viscosity and provide a flat, nonglossy appearance, proper hardness and toughness, to the applied cured coating film may be added to the polymeric binder mixture. Micropowders may be added on a weight basis, from about 5 to about 60 parts per 100 parts, by weight, of organic coating components (binder). Toluene, xylene, and/or 1,1,1-trichloroethane can be added, if desired, to provide minor adjustments to suit the individual coating process used to apply the coating to the substrate. Pigments such as carbon black, titanium dioxide, or similar color opacifying pigments may be added if desired.

The resulting compounded coating can be applied directly to EPDM or similar elastomeric substrate without first applying a primer coating, i.e. free of a primer coating or otherwise pre-treating the substrate surface. A primer is generally considered to be a surface treatment which enhances the adhesion of a top coat to a substrate. Application of the coating of the present invention can be by dip coating or other suitable application method. The applied coating is typically around four minutes at temperatures above about 120° C., and preferably between about 170° C. and 230° c. The appearance of the cured coating film is uniform and homogeneous. A non-uniform appearance would indicate a phase separation and unacceptable film, as is often the case with unsatisfactory prior art compositions. Cured films of this invention can be rubbed with acetone without removing any coating, which indicates a completely cured and crosslinked polymeric binder, as well as good dispersion of silicone oil in the cured coating matrix.

According to the present invention, unexpected results have been obtained with regard to abrasion resistance when the composition is utilized by itself as a coating. Specifically, the abrasion resistance, as determined by the Crockmeter abrasion resistance test, was generally above 5,000 cycles, desirably above 10,000 cycles, more desirably above 15,000 cycles, and preferably above 20,000 and even 25,000 and 30,000 cycles.

The coating composition of the present invention may be applied either before, concurrently with, or after vulcanization of the EPDM substrate. The resulting cured coating or film exhibits a hard surface having very high abrasion resistance and a low friction coefficient, as well as the other desirable cured film properties previously mentioned. Subsequent operations, such as die cutting at elevated temperatures do not degrade lo the cured film. In addition to utilization as a coating on an automotive glass run channel, the coating compositions of the present invention are generally useful to reduce friction, as well as to improve resistance to weather, heat, ozone, ultraviolet light, marring of surfaces, and the like, and thus can be utilized in windshield wipers, upholstery, engine mounts, luggage, and the like.

The coating composition of the present invention will be better understood by reference to the following illustrative examples which do not serve to limit the scope of the invention.

EXAMPLES

Preparation of Blocked Urethane Prepolymers (Resin I)

Solution A Preparation

Into a 2-liter reaction flask equipped with an air-driven stirrer was charged toluene (550 ml). Under dry nitrogen gas atmosphere, 108 ml toluene was distilled off to eliminate water. 52 g methylene diphenyl diisocyanate (MDI, 208 moles) was mixed with the dry toluene to give Solution A.

Solution B Preparation

Into another 2-liter reaction flask, equipped with a stirrer, was charged 218.8 g Polytail H (100 moles; 200 meq. OH) and 600 ml toluene. Polytail H (Mitsubishi Chem. Ind.) is a hydroxy-terminated polybutadiene which is ~100% hydrogenated. Its approximate structure is:

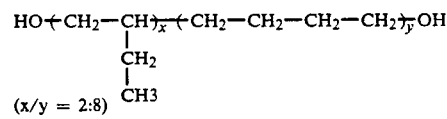

$(x/y = 2:8)$

The distributions of the (x) and (y) moieties are mostly random and the compound, on the average, contains about 2.3 hydroxyl groups per molecule.

The mixture was stirred for 1 hour at 105°-110° C., under dry nitrogen gas flow, and 150 ml toluene was distilled off to azeotrope off the water. The solution was mixed with 6 ml DABCO T-12 (dibutyltin dilaurate from Air Products) to give Solution B.

Capping The Hydrocarbon Polyol with MDI

Solution B was dropped into Solution A during 1.5 hours (under dry nitrogen gas flow) with vigorous agitation at 105°-110° C. The mixture was kept at 700° C. overnight with slow stirring and dry nitrogen gas flow, after which the isocyanate content was determined to be 0.185 meq./g (in agreement with the calculated amount).

Blocking of the Isocyanate Group with Caprolactam

A total of 23 g (228 moles) of caprolactam was added to the mixture and refluxed for 3 hours. The caprolactam blocking reaction was monitored by transmission IR.

Analysis and Characterization of the Coating Resin

The reaction product (polyolefin diol/MDI/caprolactam) was analyzed by NMR, HPGPC and DSC. The peak molecular weight was ~8,000, which indicated that the average repeating unit (n) of [(Polytail H)-(MDI)] is about 2 in structure (I).

Structure I is as follows:

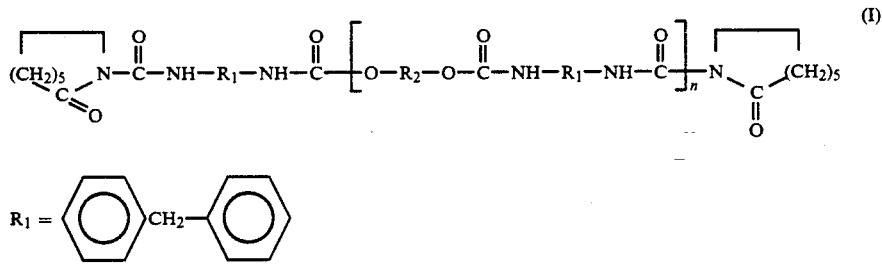

$R_2$ = hydrocarbon diradical of polyolefin diol.

There was a by-product with molecular weight ~500. It was identified as:

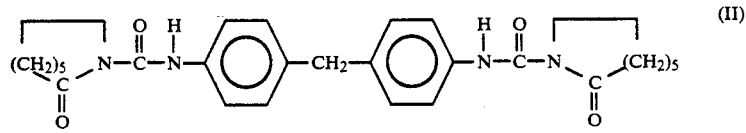

This is MDI with both isocyanate groups blocked with caprolactam, structure (II). The final reaction mixture was a solution of 29% solids in toluene.

A portion of the reaction mixture (278 g) was heated under dry nitrogen flow at 70°-90° C. for ~3 days to drive off the solvent and isolate a sample of the solid product. 80 g of rubbery material (Resin I) was obtained.

HPGPC analysis indicated no change of the molecular weight distribution of the product (Resin I) before and after the above mentioned heat stripping of solvent. This suggested that Resin I is stable at about 90° C. for more than 3 days.

Using the same procedure set forth hereinabove, 2-butanone oxime-blocked resin was prepared from Polytail H capped with MDI. The resin structure of the products was very similar to Resin I except for the blocking agent.

I. PREPARATION OF CONTROL (RESIN II)

Another resin (Resin II, i.e., a control) was also prepared by capping a non-hydrocarbon, that is polycaprolactone polyester polyol (Tone Polyol, molecular weight ~2,000; hydroxy content 1.0 meq./g, Union Carbide) with MDI and blocking the free isocyanate groups with caprolactam. The synthesis method was very similar to that used for Resin I. Analysis by NMR, HPGPC and DSC indicated the following structure: (caprolactam)-(MDI)-[(Tone-polyol)-(MDI)]$_n$-(caprolactam)(III). The peak molecular weight distribution was ~8,200, indicating the average n value to be ~2.

II. SILICONE OIL COMPATIBILITY

Example

The mixtures A, B, C, D, E and F in Table I were prepared by mixing with a magnetic stirrer and heating at ~60° C. Silicone oil phase separation of the mixtures was examined visually after cooling to room temperature. A, B, C. and E did not show any phase separation after 2 weeks storage at room temperature. Samples D and F did not show any phase separation in 2 days; however, in 2 weeks a transparent phase was observed at the bottom. The appearance of sample A was water-clear at ≧30° C. and slightly turbid at 25° C. Samples B, C, D, E and F (fumed silica added) were translucent. The above mentioned test results are set forth in Table I.

Comparison Examples (Polyester Intermediate)

The mixtures G, H, Q and R in Table II were likewise prepared by mixing with a magnetic stirrer and heating at ~60° C. Phase separation of the mixtures was examined visually after cooling to room temperature. Sample H showed phase separation in 30 minutes after the magnetic stirring was stopped. Samples I, J, K, L and M showed phase separation within 1 day. Samples N, O, P and Q were not clear after a few days; however, they clearly showed a transparent phase in 2 weeks. Samples Q and R did not show any phase separation after 2 weeks. The above mentioned test results are set forth in Table II.

Coating Appearance

A piece of EPDM rubber glass run channel was dip-coated with each of the mixtures in Table I. The appearance of the coatings during air drying was visually observed. All the mixtures (Resin I) of B, C, D, E and F dried to form a flat and uniform coating. The mixture A was uniform but shiny. The above mentioned test results are shown in Table I.

Comparison Examples (Polyester Intermediate)

A piece of EPDM rubber glass run channel was likewise dip-coated with each of the mixtures in Table II. The appearance of the mixtures during air drying was visually observed. Samples H, I, J, K, L and M (Resin II) dried to an inhomogeneous coating containing shiny spots with 1-2 mm diameter. This spotting is clear evidence of the phase separation of silicone oil. However, mixtures of N, O, P and Q (high silica level versions of J, K, L and M, respectively) dried to a flat and uniform coating. However, coatings from samples N, O, P and Q had very low strength. Table II shows that these samples also have poor abrasion resistance. A, G and R, which had no silicone oil, dried to form a shiny and smooth coating. The above mentioned test results are shown in Table I or Table II.

III. COATING CURE CONDITIONS

Each piece of EPDM rubber glass run channel, which was dip-coated with the mixtures, was heated at 200° C. for 4 minutes in an air oven. The heated coatings were rubbed with acetone-soaked paper towel immediately after the heating. The paper towel was visually examined to detect evidence of lack of cure. The results are as follows.

Coatings A, B, C, G, H and I (no cross-linking agent added) and coatings K, L, M, O, P and Q (low molecular weight amine crosslinking agent added) showed stains using the acetone wipe test. The staining indicates incomplete cure of the coatings. None of the coatings containing amine-terminated polymeric cross-linking agents (e.g., compounds D, E, F, J, N and R) showed staining, indicating complete cure. Coatings of compounds D, E and F (Resin I) remained flat and smooth after the wipe test; however, coatings of compounds J and N lost the silicone oil from the 1-2 mm diameter spots on the surfaces. The above mentioned test results are shown in Table I or Table II.

IV. TESTS OF ABRASION AND FRICTION COEFFICIENT (i) A sponge bulb or a piece of uncoated EPDM rubber weatherstrip for an automobile was spray-coated with the mixture E in Table I, heated at 200° C. for four minutes in a hot air oven. The coated sponge bulb was tested on a Weizenbeek abrasion resistance tester at 60 cycles per minute and 3 pounds load. The abrasion resistance was 25,500 cycles; the coating thickness was $\leq 5$ μm measured by an optical microscope. The abrasion resistance was ~20 cycles without the coating.

(ii) A piece of uncoated EPDM rubber glass run channel was directly brush-coated with the mixture of 100 parts 2-butanone oxime blocked Polytail H (capped with MDI), 300 parts toluene, 400 parts 1,1,1-trichloroethane, 20 parts silicone oil (Union Carbide L-45), fumed silica (Degussa TS/100), 14 parts nylon powder (400 mesh; Rilsan (O), and 9.6 parts Jeffamine T403 (Texaco Chemical Co.). The coated EPDM rubber glass run channel was heated at 130° C. for five minutes in an air oven. The coating appearance was flat and uniform. The crockmeter abrasion resistance was 34,000 cycles and the coating thickness was 29 m. The coating showed no abrasion after 3,000 cycles on the crockmeter abrasion tester, when mud was sprayed at the beginning and every 1,000 cycles, where the mud is prepared by mixing 3 parts water and 1 part dust (Type 1—0.25 parts; Type 2—0.75 parts (JIS-Z-8901). It is demonstrated that the coating of this invention reinforced with a higher level of fumed silica and nylon powder is tough enough to resist sharp edges (e.g., of sands).

(iii) A piece of uncoated EPDM rubber glass run channel was sand-blasted on the surface at 40 psi, then sand wiped off with toluene, brush-coated with 5 percent benzophenone in toluene, UV irradiated, and spray-coated with coating E. The coated glass run channel was heated in an air oven at 200° C. for 4 minutes. The appearance of the coating was flat, smooth, uniform and black without any indication of separation of silicone oil. The cured coating was tested using a modified crockmeter abrasion tester, in which a glass edge slides at a 3 kg load at 66 Hz on a given test specimen. The glass edge was reground at every 5,000 cycles with No. 4 sandpaper. This crock-meter tester is equipped with a sensor to measure force or friction. The failure of the crockmeter test was determined at the cycle at which the friction coefficient went beyond 0.38. The test was repeated at least twice.

The coating thickness was measured using an optical microscope after the crockmeter abrasion test. The results of the crockmeter abrasion test and thickness measurement are shown in Table III together with reference data for comparison. The reference samples were EPDM rubber glass run channels coated with a urethane coating containing silicone oil.

No coating debris was observed for samples 1 and 2 during and after the crockmeter test. The microscopic measurement of samples 1 and 2 indicated almost no difference in the coating thickness between the coating which contacted the glass abrader versus the uncontacted area.

On the other hand, coating debris was observed for all of the reference samples during and after the crockmeter test. The glass edge penetrated the coating layers to the EPDM rubber substrate before the failure of the crockmeter test for all the reference samples.

A piece of EPDM glass run channel coated with mixture E was heated to 150° C. in an air oven and manually rubbed with the glass edge (used for the crockmeter test) with $\geq 5$ kg load while in the hot air oven. There was no streak mark after the rubbing.

A piece of EPDM glass channel kept on a laboratory bench for two months was directly spray-coated with compound E, heated at 200° C. for 4 minutes and tested on the crockmeter. No coating debris and no adhesion failure were observed at 10,000 cycles. This indicated that high abrasion resistance can be achieved without surface treatment of EPDM substrate that has been stored for a long period of time. Previously, it was observed that glass run channels develop a surface bloom with time. Using more polar coatings such as Versikote, it is necessary to thoroughly clean the surface to get good adhesion. Versikote is an abrasion resistant coating containing a blend of a polyether and-/or a polyester with a silicon oil and is manufactured by GenCorp.

Mixtures with high silica content and Resin II (N, O, P and Q) became flat and uniform coatings after heating at 200° C. for 4 minutes; however, their strength was so low that the coatings were abraded even by fingernail rubbing.

Table III shows that the coating invented in the present work has the best abrasion resistance among the available coatings for EPDM glass run channels.

TABLE I

| Mixture: | A | B | C | D | E | F |
|---|---|---|---|---|---|---|
| Ingredients (parts by weight) | | | | | | |
| Resin I (Invention) | 100 | 100 | 100 | 100 | 100 | 100 |
| Toluene | 900 | 900 | 900 | 900 | 900 | 900 |
| Silicone Oil | 25 | 15 | 20 | 20 | 20 | 20 |

TABLE I-continued

| Mixture: | A | B | C | D | E | F |
|---|---|---|---|---|---|---|
| (Union Carbide L-45) | | | | | | |
| Fumed Silica (Degussa TS-100) | — | 8 | 8 | 8 | 8 | 8 |
| Jeffamine ED600 (polyoxyethylenediamine) | — | — | — | 6.5 | — | — |
| Jeffamine T403 (polyoxypropylenetriamine) | — | — | — | — | 3.2 | — |
| Genamid 747 (polyamidediamine) | — | — | — | — | — | 2.3 |
| Silicone Oil Phase Seperation | | | | | | |
| Phase Separation Occurrence | >14 days | >14 days | >14 days | 2-14 days | >14 days | 2-14 |
| Appearance During Drying on Substrate | Uniform | Uniform | Uniform | Uniform | Uniform | Uniform |
| State of Cure After Heating at 200° C. for 4 min. | Incomplete | Incomplete | Incomplete | Complete | Complete | Complete |
| Coating Appearance After Heating at 200° C. for 4 min. | Uniform Shiny Black | Uniform Flat Black | Uniform Flat Black | Uniform Flat Black | Uniform Flat Black | Uniform Flat Black |
| Crockmeter Abrasion Resistance | Poor* | Poor* | Poor* | ≧20,000 | ≧30,000 | ≧10,000 |

*Less than 5,000

TABLE II

| Mixture: | G | H | I | J | K | L | M | N | O | P | Q | R |
|---|---|---|---|---|---|---|---|---|---|---|---|---|
| Ingredients (parts by weight) | | | | | | | | | | | | |
| Resin II (Control) | 100 | 100 | 100 | 385 | 385 | 385 | 385 | 385 | 385 | 385 | 385 | 385 |
| Toluene | 900 | 900 | 900 | 900 | 900 | 900 | 900 | 900 | 900 | 900 | 900 | 900 |
| Silicone Oil (Union Carbide L-45) | — | 25 | 15 | 21 | 42 | 21 | 81 | 81 | 162 | 81 | 81 | — |
| Fumed Silica (Degussa TS-100) | — | — | 8 | 7 | 7 | 7 | 27 | 46 | 46 | 46 | 46 | — |
| Genamid 747 (polyamidediamine) | — | — | — | 44 | — | — | — | 11.5 | — | — | — | 11.5 |
| Jeffamine ED148 (polyoxyethylenediamine) | — | — | — | — | 27 | — | — | — | 7.0 | — | — | — |
| Trimethylhexamethylenediamine | — | — | — | — | — | 25 | — | — | — | 6.4 | — | — |
| 1,3-bisaminomethylcyclohexane | | | | | | | 7.4 | — | — | — | 7.4 | — |
| Silicone Oil Compatability | | | | | | | | | | | | |
| Phase Separation Occurrence | — | <30 min. | <1 day | <1 day | <1 day | <1 day | <1 day | 2-14 days | 2-14 days | 2-14 days | >14 days | >14 days |
| Appearance During Drying on Substrate | — | Shiny Greasy Spots | Shiny Greasy Spots | Shiny Greasy Spots | Shiny Greasy Spots | Shiny Greasy Spots | Shiny Greasy Spots | Flat Uniform | Flat Uniform | Flat Uniform | Flat Uniform | Shiny Uniform |
| State of Cure After Heating at 200° C. for 4 min. | Incomplete | Incomplete | Incomplete | Complete | Incomplete | Incomplete | Incomplete | Complete | Incomplete | Incomplete | Incomplete | Complete |
| Coating Appearance After Heating at 200° C. for 4 min. | Uniform Shiny | Non-Uniform | Non-Uniform | Non-Uniform | Non-Uniform | Non-Uniform | Non-Uniform | Flat Uniform Whitish | Flat Uniform Whitish | Flat Uniform Whitish | Flat Uniform Whitish | Shiny Uniform Black |
| Crockmeter Abrasion Resistance | — | Poor* | Poor* | Poor* | Poor* | Poor* | Poor* | Very** Poor | Very** Poor | Very** Poor | Very** Poor | — |

*Less than 5,000 cycles
**Less than 1,000 cycles

TABLE III

| Sample Number | Coating Sample | Initial Friction Coefficient | Crockmeter Abrasion Resistance (Cycles) | Thickness (μm) | Abrasion Resistance Index (Cycles/μm) |
|---|---|---|---|---|---|
| 1 | Present Invention | 0.095 | 30,000 | 15.5 | 1935 |
| 2 | Present Invention | 0.095 | 29,500 | 11.5 | 2565 |
| 3 | Nova Nummi[1] | 0.190 | 15,000 | 24.0 | 625 |
| 4 | Nova Nummi[1] | 0.113 | 30,000 | 24.0 | 1250 |

TABLE III-continued

| Sample Number | Coating Sample | Initial Friction Coefficient | Crockmeter Abrasion Resistance (Cycles) | Thickness ($\mu$m) | Abrasion Resistance Index (Cycles/$\mu$m) |
|---|---|---|---|---|---|
| 5 | Nova Nummi[1] | 0.113 | 30,000 | 24.0 | 1250 |
| 6 | Mazda CT20 | 0.208 | 11,900 | 26.7 | 446 |
| 7 | Mazda CT20 | 0.208 | 15,400 | 26.7 | 577 |
| 8 | Mazda CT20[2] | 0.038 | 13,384 | 50.0 | 246 |
| 9 | Mazda CT20[2] | 0.038 | 11,210 | 50.0 | 238 |

[1]Nova Nummi is a polyether-ester polyurethane and contains a primer.
[2]coating is polyether-polyester urethane and contains a primer As apparent from the above examples and data, the coating composition of the present invention yielded coatings with outstanding abrasion resistance and low friction as compared to the coating compositions of the prior art.

Resin IA (Hydroxy-terminated Crosslinking Agent)

A resin (resin IA) was prepared in the same way as resin I except it was scaled up to 20 times of I. Resin IA was used for the evaluation of a hydroxy-terminated crosslinking agent for the coating of EPDM glass run channels. One hundred (100) parts of Resin IA, 2.7 parts of 2-ethyl-2-hydroxymethyl-1,3-propanediol (Formrez T-279; Witco Corp.), 8 parts of fumed silica (Degussa TS-100), 20 parts of silicone oil (Union Carbide L-45), 900 parts of toluene, and 1.5 parts dibutyltin dilaurate (Dabco T-12 from Air Products Co.) were mixed with a magnetic stirrer and heated for 3 hours at ~40° C. The mixture was brush-applied to an uncoated EPDM rubber glass run channel and heated at 200° C. for 4 minutes in a hot air oven. The average dry thickness of the coating was 15.6 microns from the microscopic measurement. The appearance of the coating was flat and black. The acetone-soaked paper towel test did not show stain, demonstrating total coating cure. The crockmeter abrasion test with 3 kg load and 60 cycles per minute showed >20,000 cycles. There was no debris left after the crockmeter test. These test results indicate that hydroxy-terminated crosslinking agents are useful for the coatings of this invention along with the various amine terminated crosslinking agents.

Comparative Example Utilizing Japanese Patent Application 59-201,838 Composition (No Crosslinking Agent)

One hundred parts of Polytail H, 18 parts of ε-caprolactam-blocked hexamethylene diisocyanate (prepared in-house), 33 parts of silicone oil (L-45 ®, Union Carbide), 9.3 parts of Degussa TS100 (fumed silica), and 1058 parts of toluene were mixed with a magnetic stirrer for four hours. The mix was brush-applied to a piece of EPDM glass run, dried and heated at 200° C. for 20 minutes or at 150° C. for 3.5 hours. The coated samples were tested on a crockmeter abrasion tester at 3 kg load and 60 cycles per minute. Both samples failed at ≦600 cycles.

One hundred parts of Polytail H. 40 parts of methylethyl ketoxime-blocked triisocyanatohexyl isocyanurate (cyclic trimer of hexamethylene diisocyanate: Desmodur ® BL-3175 from Mobay Corp.), 1 part of Dabco ® T-12 (Air Products Chem. Inc.), and 1260 parts of toluene were mixed with magnetic stirrer at 40° C. for 4 hours. To this solution was added 20 parts of silicone oil (L-45 ®, Union Carbide) and 10 parts of Degussa TS100, which was mixed with a magnetic stirrer for four hours. A piece of EPDM glass run channel was brush-coated with the above-prepared mix and heated at 200° C. for 4 minutes and tested with a crockmeter abrasion tester at 3 kg and 60 cycles per minute. The sample failed at less than 1000 cycles in 3 tests.

The stoichiometric ratios of the OH groups of Polytail H and blocked NCO groups of the above two comparative examples are 1:1. From both comparative examples it is obvious that systems of Polytail H and blocked polyisocyanate do not produce good quality coatings of EPDM glass run channels.

Coating Material

According to another aspect of the present invention, the above-described primerless abrasion resistant polyurethane composition is utilized in generally small amounts as an adhesion promoter resin admixed with one or more coating material resins. In other words, it has been found that the above-described polyurethane blocked prepolymer resin when utilized in small amounts acts as an adhesion promoter with other coating material resins and forms an effective bond or attachment to substrates such as rubber. When so utilized, the adhesion promoter resin system need not contain silicone oil, fillers, and the like, inasmuch as the same are optional, but only the blocked polyurethane prepolymer. The coating blend resin composition can be cured to the substrate by moisture cure and/or by utilizing one or more curing agents either as part of the prepolymer(s) or as a separate compound, generally in the presence of heat.

Examples of suitable rubber substrates include generally those made from conjugated dienes having from 4 to 12 carbon atoms such as butadiene, isoprene, and the like; copolymers of a rubber made from a conjugated diene having from 4 to 12 carbon atoms as set forth immediately hereinabove and a vinyl substituted aromatic having from 8 to 12 carbon atoms such as styrene, alpha methyl styrene, and the like with a specific example being styrene butadiene rubber; various nitrile rubbers which are generally copolymers of acrylonitrile and a conjugated diene having from 4 to 12 carbon atoms and preferably butadiene; ethylene propylene rubber, ethylene propylene diene-monomer rubber (EPDM) wherein the diene monomer is a non-conjugated diene such as cyclopentadiene, methylnorbornene, ethylnorbornene, and the like. Suitable substrates also include various thermoset or thermoplastic polyolefins containing repeat units having from 2 to 5 carbon atoms, such as polypropylene, polyethylene and the like. The preferred substrate of the present invention is EPDM. The above substrates are well known to the art and to the literature and generally the exact chemical make-up thereof is not critical to the present invention.

The coating material resin which is blended with the above-noted abrasion-resistant polyurethane is generally any coating material resin which heretofore required a primer on the substrate in order to have good adhesion thereto. That is, according to the present invention, utilization of small amounts of the above-described adhesion promoter resin eliminates the need to prime the substrate. Such coating material resins are generally various polyurethanes which serve either as a cosmetic coating or a functional coating, i.e., possess one or more particular end-use properties such as high abrasion resistance, low friction, long shelf life, good release properties, etc. Such polyurethanes are generally known to the art and to the literature and also include conventional types of polyurethanes. Examples of other coating material resins which can be utilized blended or in admixture with the above-described adhesion promoter resin include various polyesters, various polyolefins such as polyethylene, various epoxy resins, various acrylate resins, various phenolic resins, various melamine resins, and the like. However, blocked polyurethane resins are preferred.

The various one or more coating material resins which are blended with the adhesion promoter resin are applied to the substrate and subsequently cured. Curing, which generally involves crosslinking and/or chain extension, can be achieved in a number of ways by moisture cure and/or by utilizing various one or more types of curing agents. The curing agent can actually be a part (that is, reacted therewith) of the prepolymer of either the adhesion promoter resin, the coating material resin, or both, or separate therefrom. In other words, cure can be effected in any manner known to the art or to the literature. Thus, when moisture cure is utilized, the blocked isocyanate groups of either the adhesion promoter, the coating material resin, or both, are reacted with the moisture in the air and generally chain extend the prepolymer in a known manner as by the formation of amine-terminated compounds. The curing agent can be a triisocyanate which is already contained in the prepolymer as of the adhesion promoter resin, the coating material resin, or both. Additionally, curing agents per se, such as various crosslinking agents, can be added to either the adhesion promoter resin, the coating material resin, or both and, upon cure, serve to generally crosslink or form a branch network. Various types of curing agents and crosslinking agents are discussed hereinbelow. The amount of the curing agent(s) is of sufficient or effective amount to generally cause partial crosslinking or branching. That is, the amount is such that upon cure, the range of desired physical or performance properties sought are improved to a desirable degree. Of course, if desired, the amount of cure can be total.

The various known or conventional polyurethanes which can be utilized as the coating material resin are generally urethanes made from hydroxyl-terminated polyester, polyether, or mixed polyester-polyether intermediates. The various hydroxyl terminated intermediates are generally reacted with a polyisocyanate to form a prepolymer which is subsequently blocked.

When a hydroxyl-terminated polyether is utilized as an intermediate, the polyether portion is made from oxyalkylene compounds having from 2 to 6 carbon atoms, and preferably 2 or 3 carbon atoms, e.g., ethylene oxide, propylene oxide, butylene oxide, isobutylene oxide, etc., with ethylene oxide, propylene oxide, or combinations thereof being preferred. The weight average molecular weight of such polyether intermediates is generally from about 5,000 to about 15,000, with from about 1,000 to about 8,000 being preferred.

The hydroxyl-terminated polyester intermediates are generally made from glycols having from about 2 to about 10 carbon atoms, and desirably from about 2 to about 6, with specific examples including ethylene glycol, propylene glycol, butylene glycol such as 1,4-butane diol, hexamethylene glycol, and the like, with hexamethylene glycol being preferred. The dicarboxylic acids utilized to form the hydroxyl-terminated polyester intermediate can either be aliphatic, aromatic, or combinations thereof and generally contain 2 to 15 carbon atoms with specific examples including succinic acid, glutaric acid, adipic acid, pimelic acid, azelaic acid, phthalic acid including terephthalic and isophthalic acid, and the like. Generally, adipic acid, terephthalic acid, phthalic acid, or combinations thereof are preferred. The weight average molecular weight of the hydroxyl-terminated polyester intermediate is generally from about 500 to about 15,000, and preferably from about 1,000 to about 8,000.

In accordance with the present invention, blends of one or more hydroxyl-terminated polyethers and/or one or more hydroxyl-terminated polyesters can be utilized to form the intermediate material for the polyurethane-type coating material resin. As part of the composition form of the prepolymer, various polyols can be utilized which are often referred to as chain extenders, and/or crosslinking agents. The same is discussed hereinafter in great detail and are utilized in small amounts and generally have an average of greater than two hydroxyl groups whenever it is desired that the prepolymer be branched so that upon curing in the presence of heat, a cured or crosslinked polyurethane is obtained. Examples of such compounds include glycerol, erythritol, trimethylol propane, and the like.

Considering the polyisocyanate compounds which can be utilized to form the prepolymer, they can generally be represented by the formula:

where n is from about 1.8 to about 4 and preferably from about 2 to about 2.5. When n is greater than 2.0, it serves as a curing agent, that is, a crosslinking or branching agent. Preferably, n is approximately 2.0. The equivalent mole ratio of NCO to OH of the hydroxyl terminated intermediate is generally from about 0.8 to about 4.0, and desirably from about 0.9 to about 1.5 and preferably about 1.0. When moisture cure is desirable, the NCO/OH equivalent mole ratio is generally greater than 1.0, as from about 1.01 to about 3.0, and desirably from about 1.02 to about 1.5. Examples of suitable polyisocyanates include compounds wherein R is an aliphatic such as an alkyl having from 2 to 20 carbon atoms, a cycloaliphatic or, preferably, a cycloalkyl, containing from 4 to about 20 carbon atoms, an aromatic containing from 6 to about 20 carbon atoms, or combinations thereof, e.g., alkyl-substituted aromatic, etc. Suitable diisocyanates include meta- or para-phenylene diisocyanate, diphenyl methane diisocyanates, bitolylene diisocyanates, dianisidine diisocyanates, isophorone diisocyanates, toluene diisocyanates, hexamethylene diisocyanate and pentamethylene diisocyanate. Preferred aliphatic diisocyanates include 1,6-hexane diisocyanate, mixed trimethylhexane diisocyanate (TMI), isophorone diisocyanate (IPDI), and the like. Preferred aromatic diisocyanates include 4,4-methylene diphenyl isocyanate (MDI), as well as modified MDI known as Isonates (Dow Chemical), toluene diisocyanate (TDI) such as the 2,4-or 2,6-isomers, as well as mixtures thereof, 1,4-phenylene diisocyanate, m- and p-xylenene diisocyanates (xDI), and the like. Specific examples of triisocyanates include diphenyl diisocyanates, 2,4,4'-triisocyanatediphenyl ether, triphenyl methane triisocyanate, benzene-1,2,4-triisocyanate, naphthalene-1,3,7-triisocyanate, Desmodur ®N-3300, an aliphatic polyisocyanate base upon hexamethylene diisocyanate, and the like. Whenever a triisocyanate is utilized to effect crosslinking, the amount thereof is very small, that is, an effective amount to improve desired processing or coating performance, i.e., physical properties, and can be an equivalent ratio as noted hereinabove. Mixtures of various polydiisocyanates can be used if desired.

The polyurethane coating material resin of the present invention made from a hydroxyl-terminated polyester, polyether, etc., and the polyisocyanate is desirably blocked. Simple blocking agents are the same as set forth hereinabove with regard to the hydroxyl-terminated polyolefin intermediate, and thus the same is hereby fully incorporated by reference. Rather than to repeat the same, briefly, such blocking agents include various lactams having from about 3 to about 12 carbon atoms, various ketoximes having from about 3 to about 20 carbon atoms, various phenols containing from 3 to about 20 carbon atoms, various cyclic ureas having from about 3 to about 12 carbon atoms, various enamines having the formula

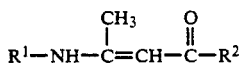

where $R^1$ and $R^2$, independently, is an alkyl having from 1 to 4 carbon atoms can also be utilized. Another group of blocking agents are the various dicarbonyl compounds having the general formula

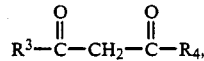

where $R^3$ and $R^4$, independently, is an alkyl having from 1 to 6 carbon atoms, phenyl, or $R^5O$, where $R^5$ is hydrogen or an alkyl having from 1 to 12 carbon atoms such as: acetylacetone, diethylmalonate, dimethylmalonate, acetylethyl acetate, and the like. Still other blocking agents include benzotriazole, the various phenylimidazoles, and the like. Desirably, the amount of blocking agent is an equivalent excess as from about 0.9 to about 1.5, and preferably from about 1.01 to about 1.20 based upon the ratio of blocking agent to NCO groups.

The above blocked polyurethane prepolymer generally constitutes the coating material resin of the present invention when the same is a polyurethane. The coating material polyurethane prepolymer resin can optionally contain curing agents therein either as part of the blocked prepolymer (that is, reacted therewith) or in addition thereto (that is, in admixture therewith). A specific type of curing agent are the various chain extenders which are generally polyols containing a total of from about 2 to about 15 carbon atoms, and preferably from about 2 to about 6 carbon atoms. The number of active hydroxyl groups therein is generally two, unless it is desired that the chain extender also act as a crosslinking agent wherein the number of hydroxyl groups is generally three, four, or the like. Of course, blends of various polyols can be utilized in which event the number of hydroxyl groups is not necessarily an integer, but some number greater than two. Examples of suitable chain extenders include ethylene glycol, propylene glycol, butane diol such as 1,4-butane diol, dipropylene glycol, diethylene glycol, and the like. Another preferred class are the various polyhydric alcohols having from 3 to 15 carbon atoms and preferably from 3 to 10 carbon atoms and from 3 to 8 hydroxyl groups such as triols, tetraols, pentols, hexols, and the like with specific examples including glycerol, erythritol, pentaerythritol, arabitol, sorbitol, trimethylol propane; and the various ethylene or propylene oxide adducts of trimethylol propane, glycerol, pentaerythritol, sorbitol, and the like. If a chain extender is utilized, the amount thereof is generally less than 10.0 percent by weight based upon the weight of the urethane prepolymer resin, and desirably less than 5.0 percent by weight. When a triol, etc., is utilized to crosslink or branch the prepolymer, the amount thereof is of a sufficient or effective amount to increase the desired physical or processing properties thereof. Such an amount can vary inasmuch as other curing agents can be utilized such as an excessive diisocyanate, crosslinking agents per se, and the like.

When the curing agent is a crosslinking agent per se, it is generally the same as noted hereinabove with regard to the polyolefin intermediate, and includes compounds or agents containing $-NH_2$, $-NHR^6$, etc. groups where $R^6$ is an alkyl having from 1 to 4 carbon atoms, $-OH$ or $-SH$ groups, and the like. Particularly preferred curatives, or crosslinking agents, can be the same as set forth hereinabove with regard to preparation of the adhesion promoter resin and thus are hereby fully incorporated by reference. Hence, particularly preferred curative, crosslinking, or branching agents include aliphatic, primary or secondary di-, tri-, and tetra-functional amines having a boiling point above about 100° C. and preferably above 180° C. Useful amine crosslinking agents include, for example, polyoxypropylene- or polyoxy(propylene/ethylene)-based primary di- and triamines sold by Texaco Chemical Company under the tradename "Jeffamine," which are herein fully incorporated by reference, such as T-403 (triamine; MW about 480), EDR-148 (diamine; MW about 150), T-3000 (triamine; MW about 3,000), T-5000 (triamine; MW about 5,000), D-230 (diamine; MW about 200), D-400 (diamine; MW about 400), or D-2000 (diamine; MW about 2,000). Other crosslinking agents include polyamine resins containing amino end groups, sold by Henkel Corporation under the tradenames "Versamid" or "Genamid," which are hereby fully incorporated by reference, such as Versamids 100, 115, 125, 140, 150, 250, or Genamids 250, 747, 2000, and the like. Still other useful amine curatives include isophoronediamine (Huels Co.), mixed trimethylenediamine (TMD; Huels Co.), N,N,-diaminoethylpiperazine, N-aminoethylpiperazine, 1,4-cyclohexanediamine, 1,6-hexanediamine, 1,4-butanediamine, diethylenetriamine, m- or p-xylylenediamine, ethylenediamine, liquid poly(-dimethylsiloxane)-diamine; various aromatic di- or triamines, which are liquid, or low melting, soluble or dispersible in the coating mixture, such as a ring methylated phenylenediamine (RDX-66884, sold by Interez Co.) or poly(tetramethylene oxide)-bis-(4-aminobenzoates) (Polyamine-650 and -1000 sold by Air Products), and the like. Moreover, crosslinking agents can include various compounds having at least one amine group therein and one or more OH, SH, and the like groups therein, with specific examples including triethanolamine, diethanolamine, ethanolamine, and the like. Preferred crosslinking agents include polyoxypropylene triamine, and 2-ethyl-2-hydroxymethyl 1,3-propane diol. The amount of the crosslinking agent is generally sufficient to achieve partial cure and thus is an amount to suitably increase desired processing and/or physical properties. Such an amount will vary with regard to desired end use as well as with regard to whether or not other types of curing agents are utilized. Regardless of the type of curing agent located within the prepolymer or as a separate compound in a system therewith, and regardless of whether it is a triisocyanate, etc., a chain extender, a crosslinking agent per se, or the like, generally the amount thereof is less than 100 parts by weight and desirably less than 30 parts by weight based upon 100 parts by weight of the appropriate resin, that is, the adhesion promoter resin or the coating material resin.

A particularly preferred polyurethane coating material resin is made from a blend of the following two formulations wherein the amount of the polyether intermediate is generally from about 2 to about 4, and desirably about 3 times that of the polyester intermediate system:

|  | | Wt. % |
|---|---|---|
| Formulation "AA" (Polyether Urethane Intermediate System) | | |
| Poly(propylene glycol) | ⎫ | 76.1 |
| MDI (reacted) | ⎬ Blocked Prepolymer | 16.1 |
| MDI (unreacted) | | 4.8 |
| Trimethylol propane | ⎭ | 3.0 |
| Formulation "BB" (Polyester Urethane Intermediate System | | |
| Hexamethylene glycol | ⎫ | 23.9 |
| Adipic acid | | 16.0 |
| Phthalic acid | ⎬ Blocked Prepolymer | 11.4 |
| Hydrogenated MDI | | 42.5 |
| Trimethylol propane | ⎭ | 6.2 |

As apparent from the above, the polyether urethane intermediate is a blocked prepolymer which has been blocked with methylethylketoxime and yet contains the indicated amount of reacted trimethylol propane therein as a curing agent. Similarly, the polyester urethane intermediate system also contains a blocked prepolymer which has been blocked with methylethylketoxime, and the indicated reacted amount of trimethylol propane therein as a curing agent. The above blend composition is utilized as a coating material resin containing the indicated curing agents therein in the various examples set forth hereinbelow.

The blocked urethane prepolymer resins which are utilized in the present invention as a coating material resin can contain various additives therein in conventional amounts such as silicone oil, various fillers such as nylon powder to improve abrasion resistance, silica, talcs, clays, and the like, various antioxidants, ultraviolet light stabilizers, various pigments such as titanium dioxide or carbon black, and the like.

The blocked urethane prepolymer coating material resins and the adhesion promoter resin are mixed or blended in any conventional manner to form a physical blend which is then applied to a substrate as noted hereinabove. The physical blend or admixture, as noted above, will contain one or more curing agents therein as well necessary or desirable additives, as also noted above. Such curing agents and any optional additives can be added with either the adhesion promoter resin or the coating material resin, or both. If not moisture cure at ambient temperatures, cure of the physical coating blend composition is generally at a temperature of from about 200° F. to about 450° F., or higher or lower depending upon the particular composition. The cured physical blend composition is actually the reaction product of the one or more curing agents which exists as a separate compound or as a part of the prepolymer in either the adhesion promoter resin, or in the blocked urethane coating material resin, or both. In other words, the end product is a statistical reaction product in which a particular curing agent (if an unreacted compound is used) can react with either the blocked polyurethane adhesion promoter resin, or with the blocked polyurethane coating material resin, or both. Of course, the curing agent can be part of the blocked polyurethane prepolymer of one or both systems. Thus, it should be appreciated that many generally conventional curing agent routes can be utilized as known to the art and to the literature. If the substrate is a rubber and uncured, it can be co-cured at the same time with the polyurethane coating material resin at generally the same temperature. The coating the material containing the adhesion promoter resin therein can provide a functional end use such as low friction, high abrasion resistance, and the like, or serve as a cosmetic coating such as contain a pigment therein to yield a desirable aesthetic effect.

The coating material resin of the present invention, other than the above-noted polyurethane can generally be any material which is desired to be applied to the above-noted generally rubber substrates and polyolefin substrates.

Alternatively, in lieu of the above-noted blocked urethane prepolymer resins, other types of coating material resins include various polyesters which are generally the condensation reaction product of glycols having from about 2 to about 10 carbon atoms with dicarboxylic acids having from about 3 to about 15 carbon atoms, such as polyethylene terephthalate; various polyolefins such as polypropylene, polyethylene; various epoxy resins such as polyhydric phenol polyether alcohols, glycidyl ethers of novolac resins, glycidyl ethers of bisphenols, glycidyl of polynuclear phenols, glycidyl esters, and the like; various phenolic resins such as phenol-aldehyde polymers, phenol-formaldehyde polymers, and the like; and various melamine polymers such as melamine-formaldehyde polymers, and the like. These coating material resins are mixed generally with minor amounts of the adhesion promoter resin to form a mixed physical admixture which then can be applied to a suitable substrate and cured in a manner known to the art and to the literature with regard to the respective system.

The present invention will be better understood by reference to the following examples which serve to illustrate but not to limit the scope of the present invention.

EXAMPLES

Example "s"

A urethane coating material resin according to the present invention was prepared utilizing the following components:

a urethane coating material resin obtained by preparing a urethane having methyl-ethyl-ketoxime blocked NCO groups having the composition of formulation "AA"—65.57 parts by weight;

a urethane coating material resin obtained by preparing a urethane having methyl-ethyl-ketoxime blocked NCO groups having the composition of formulation "BB"—21.89 parts by weight;

silicone oil (Union Carbide L-45)—6.97 parts by weight;

nylon powder (Rilsan 1510/50)—3.98 parts by weight;

fumed silica (Degussa TS100)—1.00 part by weight.

EXAMPLE 1

A two percent toluene solution of MDI-capped and caprolactam-blocked Polytail H urethane prepolymer prepared in a manner very similar to Resin I set forth hereinabove was mixed with the coating composition of Example "S" on a 1 to 1 weight ratio. The prepared mixture was brush-applied to a piece of cured EPDM glass run channel, the solvent was flashed off, and the coating heated in a hot air oven at 400° F. for five minutes. Coating maturation was allowed to occur for one day. The coating-EPDM rubber adhesion strength was then tested by the procedures described in Appendix 1. The failure mode was 100 percent rubber tear (demonstrating coating-rubber adhesion strength higher than rubber cohesive strength) compared with the coating peel-off result when the adhesion promoter resin was not utilized. This test shows that ≦1 percent of the adhesion promoter Resin I product is good enough to produce a strong adhesion of the coating to the EPDM vulcanizate.

EXAMPLE 2

The blocked urethane coating material resin of Example "S" containing seven different concentrations of the caprolactam-blocked urethane prepolymer resin which was prepared very similarly to Resin I of 0, 0.5, 1.5, 2.0, 3.0, 4.0, and 5.0 were prepared. Each of the prepared mixtures was brush-applied to a piece of green (uncured) EPDM glass run channel, the solvent was flashed off, and the coating was heated in a hot air oven at 400° F. for five minutes. Coating maturation was allowed to occur for one day. The coating-EPDM rubber adhesion strength was then tested by the procedures described in Appendix The failure modes were as follows:

| Amount of the Adhesion Promoter | Failure Mode (Adhesion Content (%)) |
| --- | --- |
| 0 | Coating-rubber adhesive Failure (poor) |
| 0.5 | Coating-rubber adhesive Failure (poor) |
| 1.5 | Coating-rubber adhesive Failure (poor) |
| 2.0 | Coating-rubber adhesive Failure (poor) |
| 3.0 | Coating-rubber adhesive Failure (poor) |
| 4.0 | 100% rubber tear (good) |
| 5.0 | 100% rubber tear (good) |

This test result shows that at least 3 percent of the adhesion promoter resin is necessary to get good adhesion to green EPDM rubber.

EXAMPLE 3

Each of 2 percent and 4 percent toluene solutions of MDI-capped and caprolactam-blocked Polytail HA adhesion promoter resin which was prepared very similarly to Resin I was added to the coating composition of Example "S" on a 1 to 1 weight ratio. Each of the mixtures was spray-applied to a piece of cured (vulcanized) EPDM glass run channel, and the solvent was flashed off. Coating maturation was allowed to occur for one day, and the coating adhesion strength was then tested by the procedures described in Appendix 1. The failure mode was 100 percent rubber tear for both of the specimens.

Crockmeter abrasion resistance at 3 Kg load and 60 cycles per minute were also measured for both of the coating specimens, with the following results:

| Amount of Polytail HA Version of Resin I | Crockmeter Abrasion Resistance (Cycles) |
| --- | --- |
| 1% | 3,255 |
| 2% | 3,255 |

Without coatings, the Crockmeter abrasion resistance is very low and friction is very high.

EXAMPLE 4

The coating composition of Example "S" with addition of one part by weight of fumed silica (Degussa TS100) per 100 parts of Example "S" coating composition was mixed with 25 percent of MDI-capped methylethyl ketoxime-blocked Polytail H adhesion promoter resin which was prepared very similarly to Resin I. The mixture was brush-applied to a piece of green (uncured) EPDM glass run channel, the solvent was flashed off, and the coating was heated at 400° F. for five minutes in a hot air oven. Coating maturation was allowed to occur for one day.

The coating adhesion strength, coating thickness, and Crockmeter abrasion resistance were then measured in accordance with the adhesion test method described in Appendix 1. The coating thickness was measured by an optical microscope. The Crockmeter abrasion resistance was measured at 3 Kg load and 60 cycles per minute at six-inch long amplitude. The results were 100 percent rubber tear (good adhesion), 20,400 cycles for Crockmeter abrasion resistance, and 25–50 μm (average 37.5 μm) for the coating layer thickness. The average Crockmeter abrasion resistance index is calculated to be 544 cycles per one μm.

EXAMPLE 5

A coating material resin mix was prepared by the following formulation:

Example "S" coating composition with additional 0.5 part by weight of fumed silica (Degussa TS100) per 100 parts of Example "S" coating composition—35.35 (parts by weight);

MDI-capped and Methylethylketoxime-blocked Polytail H resin from Example 4—3.54 (parts by weight);

Toluene 31.8 (parts by weight);

1,1,1-trichloroethane 29.2 (parts by weight).

The above blended resin composition was mixed with a triamine crosslinking agent (Jeffamine T403 from Texaco Chemical Company) of eleven different concentrations of 0, 0.2, 0.4, ... 1.8 parts per 100 parts of the coating material resin.

Each of the eleven mixtures was spray-applied to a piece of a precoated EPDM glass run channel with the coating material resin of Example "S" with 5 percent of the adhesion promoter of Example I. After the solvent was flashed off, each of the doubly coated sample specimens was heated for five minutes in a hot air oven at 300° F. or 400° F. After one day and three days, each of the sample specimens was tested for the coating adhesion strength by the procedures described in Appendix 1. The test results are shown in Table IV.

The test results show that the use of methylethylketoxime blocked adhesion promoter together with ≧22 percent NH$_2$/NCO stoichiometric amount of Jeffamine T403 (≧0.60 part) allows the coating to cure at 300° F. for five minutes, compared with 400° F. for five minutes when Jeffamine T403 was omitted, and that high levels of Jeffamine T403 (≧1.2 parts, ≧44 percent) do not lower the curing temperature, however, shorten the maturation time.

Test Method:
1. Apply the primer (757) evenly by brush to both the metal strip and the coated EPDM substrate. Allow at 3 seconds for solvent flash off.
2. Apply a bead of adhesive (454 Gel) [at 2mm in diameter and 75 mm in length] to the coated EPDM substrate. Place primed metal in contact with adhesive, back up rubber with another metal strip and clamp with three medium binder clips for five minutes.
3. Remove binder clips and activate the adhesive squeeze-out with a few drops of 757 primer. Do not stress the bond line for approximately ten minutes.
4. Test the coating adhesion either manually or with an Instron by performing a 180° peel test. Good coating adhesion should result in rubber tearing;

TABLE IV

| Formulation Number | Parts Jeffamine T403 Per 100 Parts HS-31-NDP (Oxime) | NH$_2$/NCO (%) Stoichiomatic Ratio | Curing Conditions Lab Recirculating Hot Air Oven | |
|---|---|---|---|---|
| | | | 5' @ 300° F. Adhesion Results (Age) | 5' @ 400° F. Adhesion Results (Age) |
| HS-31-NDP (Oxime) Control | 0.00 | 0.0 | 100% C-C (1 day) 100% C-C (3 days) | 100% C-C (1 day) 100% C-C (3 days) |
| HS-31-NDP-A (Oxime) | 0.20 | 7.2 | 100% C-C (1 day) 75% R / 25% C-C (3 days) | 100% C-C (1 day) 50% R / 50% C-C (3 days) |
| HS-31-NDP-B | 0.40 | 14 | 100% C-C (1 day) 100% C-C (3 days) | 100% C-C (1 day) 75% R / 25% C-C (3 days) |
| HS-31-NDP-C | 0.60 | 22 | 100% C-C (a day) 100% R (3 days) | 100% C-C (1 day) 100% R (3 days) |
| HS-31-NDP-D | 0.80 | 29 | 10% R / 90% C-C (1 day) 100% R (3 days) | 25% R / 75% C-C (1 day) 100% R (3 days) |
| HS-31-NDP-E | 1.00 | 36 | 50% R / 50% C-C (1 day) 100% R (3 days) | 10% R / 90% C-C (1 day) 100% R (3 days) |
| HS-31-NDP-F (Oxime) | 1.20 | 44 | 100% R (1 day) — | — — |
| HS-31-NDP-G (Oxime) | 1.40 | 50 | 100% R (1 day) — | — — |
| HS-31-NDP-H (Oxime) | 1.60 | 58 | 100% R (1 day) — | — — |
| HS-31-NDP-I (Oxime) | 1.80 | 65 | 100% R (1 day) — | — — |
| HS-31-NDP-J (Oxime) | 2.00 | 72 | 100% R (1 day) — | — — |

Note:
C-C = Coating/Coating Failure (Recoat Peeling)
R = Rubber Tear (Cohesive Failure)

APPENDIX 1

Coating Adhesion Test

Scope:
This procedure describes the materials and test method required to measure the adhesion strength of urethane coatings to EPDM substrates.

Materials Required:
1. Primer: Loctite Polyolefin Surface Primer Primer Number 757
2. Adhesive: Loctite 454 Gel (Surface Insensitive Cyanoacrylate)
3. Metal Strips: 20GA×1"×4" Test strips Drill a 5/16" hole at one end of each strip (centered and approximately ¼" from the end). All metals must be epoxy coated.
4. Medium Binder Clips (3 required per test)
5. ½" Natural Bristle Brush (1 required)
6. Brush Cleaning Solvent: 1,1,1-Trichloroethane poor adhesion will just remove the coating.
Note: The cyanoacrylate adhesive reaches optimum cure after 24 hours. Therefore, any quantitative coating peel strength should be measured after 24 hours.

As apparent from the above examples and data, it should be apparent that small amounts of an adhesion promoter resin as set forth herein effects a good bond to a rubber substrate when utilizing a polyurethane coating material resin.

While in accordance with the Patent Statutes, the best mode and preferred embodiment has been set forth, the scope of the invention is not limited thereto, but rather by the scope of the attached claims.

What is claimed is:
1. A blend, comprising:
a physical blend of a coating material resin and an effective amount of a blocked polyurethane pre- polymer adhesion promoter resin capable of securing said coating blend to a substrate.

2. A blend, according to claim 1, wherein the precursor of the polyurethane prepolymer is the reaction product of a hydroxyl functional hydrogenated polydiene or polyolefin intermediate with at least 1.8 equivalents of a polyisocyanate for each equivalent of said hydroxyl functional hydrocarbon intermediate, said hydrogenated polydiene or polyolefin having greater than 1.5 hydroxyl groups per average intermediate molecule and a number average molecular weight of from about 500 to about 15,000, and said precursor polyurethane prepolymer being blocked with a blocking agent, 3. A blend, according to claim 2, wherein said coating material resin polyurethane is made from a hydroxyl-terminated polyester intermediate, a hydroxyl-terminated polyether intermediate, or combinations thereof.

4. A blend, according to claim 3, wherein said polyisocyanate of said adhesion promoter resin has the formula.

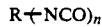

wherein n is 2, 3, or 4 and R is aromatic, aliphatic, or combinations thereof, having from 4 to 100 carbon atoms, and wherein said hydroxyl functional hydrogenated polydiene or polyolefin is mad-e by polymerizing an olefin monomer having from 2 to 6 carbon atoms, or a diene monomer having from 4 to 10 carbon atoms, and optionally, up to 50 mole percent of an ethylenically unsaturated comonomer, and optionally wherein said hydrogenated diene polymer is at least 50 mole percent hydrogenated.

5. A blend, according to claim 4, wherein said hydroxyl functional hydrogenated diene polymer is at least 95 mole percent hydrogenated, and wherein R of said polyisocyanate has from 4 to 30 carbon atoms.

6. A blend, according to claim 5, wherein the equivalent ratio of said polyisocyanate to said hydroxyl functional hydrogenated diene polymer or polyolefin is from about 2.0 to about 8.0, wherein the molecular weight of said hydroxyl functional hydrogenated diene polymer or polyolefin is from about 1,000 to about 8,000, wherein said hydroxyl functional hydrocarbon intermediate has from about 1.8 to about 6.0 hydroxyl groups per average intermediate molecule, wherein said polyisocyanate is 4,4-methylene diphenyl isocyanate, 2,4-toluene diisocyanate, 2,6-toluene diisocyanate, or 1,4-phenylene diisocyanate, or mixtures thereof.

7. A blend, according to claim 6, wherein said hydroxyl functional hydrogenated polydiene or polyolefin has the approximate formula

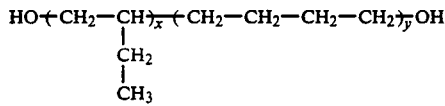

wherein the x and y units are randomly distributed, wherein the x/y ratio is from 0.10 to about 10.0 and wherein the average number of OH groups per molecule is from about 1.5 to about 4.0.

8. A blend, according to claim 3, wherein said coating material resin is said polyurethane prepolymer derived from said polyester intermediate, said polyether intermediate, or combinations thereof, and wherein said intermediate has a molecular weight of from about 1,000 to about 8,000.

9. A blend, according to claim 5, wherein said coating material resin is said polyurethane prepolymer derived from said polyester intermediate, said polyether intermediate, or combinations thereof, wherein said intermediate has a molecular weight of from about 1,000 to about 8,000, and wherein said blocked polyurethane prepolymer is the reaction product of said intermediate and a polyisocyanate wherein said polyisocyanate has the formula

where n is from about 1.8 to about 4, and wherein R is an aliphatic having from 2 to 20 carbon atoms, a cycloaliphatic having from 4 to about 20 carbon atoms, an aromatic having from about 6 to about 20 carbon atoms, or combinations thereof.

10. A blend, according to claim 7, wherein said coating material resin is said polyurethane prepolymer derived from said polyester intermediate, said polyether intermediate, or combinations thereof, wherein said intermediate has a molecular weight of from about 1,000 to about 8,000, wherein said blocked polyurethane prepolymer is the reaction product of said intermediate and a polyisocyanate wherein said polyisocyanate is toluene diisocyanate or methylenediphenyl isocyanate, wherein said polyether intermediate is made from ethylene oxide or propylene oxide, and wherein said polyester intermediate is made from adipic acid, terephthalic acid, or phthalic acid, and from hexamethylene glycol.

11. A blend, according to claim 1, including a curing agent, said curing agent comprising a crosslinking agent, a polyol containing three or more hydroxyl groups therein or a polyisocyanate having three or more isocyanate groups therein, or combinations thereof.

12. A blend, according to claim 8, including a curing agent, said curing agent comprising a crosslinking agent, a polyol containing three or more hydroxyl groups therein, or a polyamine, a polyisocyanate having three or more isocyanate groups therein, and combinations thereof.

13. A blend, according to claim 10, including a curing agent, said curing agent comprising a crosslinking agent, a polyol containing three or more hydroxyl groups therein or a polyamine, a polyisocyanate having three or more isocyanate groups therein, and combinations thereof.

14. A cured blend comprising the cured composition of claim 1.

15. A cured blend comprising the cured composition of claim 5.

16. A cured blend comprising the cured composition of claim 7.

17. A cured blend comprising the cured composition of claim 8.

18. A cured blend comprising the cured composition of claim 9.

19. A cured blend comprising the cured composition of claim 10.

20. A cured blend comprising the cured composition of claim 11.

21. A cured blend comprising the cured composition of claim 12.

22. A cured blend comprising the cured composition of claim 13.

23. A coated substrate, comprising:
a cured coating composition secured to said substrate, said cured blend being the cured blend of claim 1.

24. A coated substrate, comprising:
a cured blend secured to said substrate, said cured coating composition being the cured blend of claim 6.

25. A coated substrate, comprising:
a cured coating composition secured to said substrate, said cured coating composition being the cured blend of claim 8.

26. A coated substrate, comprising:
a cured blend secured to said substrate, said cured coating composition being the cured blend of claim 9, and wherein said substrate is a rubber substrate or a polyolefin substrate.

27. A coated substrate, comprising:
a cured blend secured to said substrate, said cured coating composition being the cured blend of claim 10, and wherein said cured substrate is EPDM.

28. A glass run channel comprising the composition of claim 23.

29. A glass run channel comprising the composition of claim 25.

30. A glass run channel comprising the composition of claim 27.

31. A process for preparing a physical blend capable of adhering to a substrate, comprising,
forming a physical blend of a blocked polyurethane prepolymer adhesion promoter resin and a coating material resin.

32. A process according to claim 31, including forming said adhesion promoter resin by reacting a hydroxyl functional hydrogenated polydiene or polyolefin with at least 1.8 equivalents of a polyisocyanate for each equivalent of said hydrogenated polydiene or polyolefin to form a prepolymer, said hydrogenated polydiene or polyolefin having at least 1.5 hydroxyl groups per average molecule and a number average molecular weight of from about 500 to about 15,000, and
blocking said prepolymer to form a blocked adhesion promoter prepolymer resin.

33. A process according to claim 32, where a blocked coating material resin is said polyurethane prepolymer derived from a polyester intermediate, a polyether intermediate, or combinations thereof, and wherein said intermediate has a molecular weight of from about 1,000 to about 8,000.

34. A cured coating blend composition, comprising the reaction product of a coating material resin, an effective amount of a blocked polyurethane prepolymer adhesion promoter resin capable of securing said coating blend to a substrate, and from about 0.5 to about 50 parts by weight of a curing agent based upon the total weight of said coating material resin and said adhesion promoter resin.

35. A cured blend, according to claim 34, wherein said coating material resin is a polyurethane prepolymer derived from a polyester intermediate, a polyether intermediate, or combinations thereof, and wherein said intermediate has a molecular weight of from about 1,000 to about 8,000, and wherein said curing agent comprises a crosslinking agent, a polyol containing three or more hydroxyl groups therein, a polyamine, or a polyisocyanate having three or more isocyanate groups therein, and combinations thereof.

36. A cured blend, according to claim 35, wherein said blocked polyurethane prepolymer is the blocked reaction product of said intermediate and a polyisocyanate wherein said polyisocyanate has the formula

where n is from about 1.8 to about 4, and wherein R is an aliphatic having from 2 to 20 carbon atoms, a cycloaliphatic having from 4 to about 20 carbon atoms, an aromatic having from about 6 to about 20 carbon atoms, or combinations thereof.

37. A cured blend, according to claim 35, wherein said polyisocyanate is toluene diisocyanate or methylenediphenyl isocyanate, wherein said polyether intermediate is made from ethylene oxide or propylene oxide, and wherein said polyester intermediate is made from adipic acid, terephthalic acid, or phthalic acid and from hexamethylene glycol.

* * * * *